Nov. 7, 1939.  A. J. PARRISH  2,179,193

SHEET METAL PIPE AND PIPE JOINT

Filed April 10, 1937  2 Sheets-Sheet 1

Inventor
Alan Jay Parrish,

By Earle D. Crammond
Attorney

Nov. 7, 1939.   A. J. PARRISH   2,179,193
SHEET METAL PIPE AND PIPE JOINT
Filed April 10, 1937   2 Sheets-Sheet 2
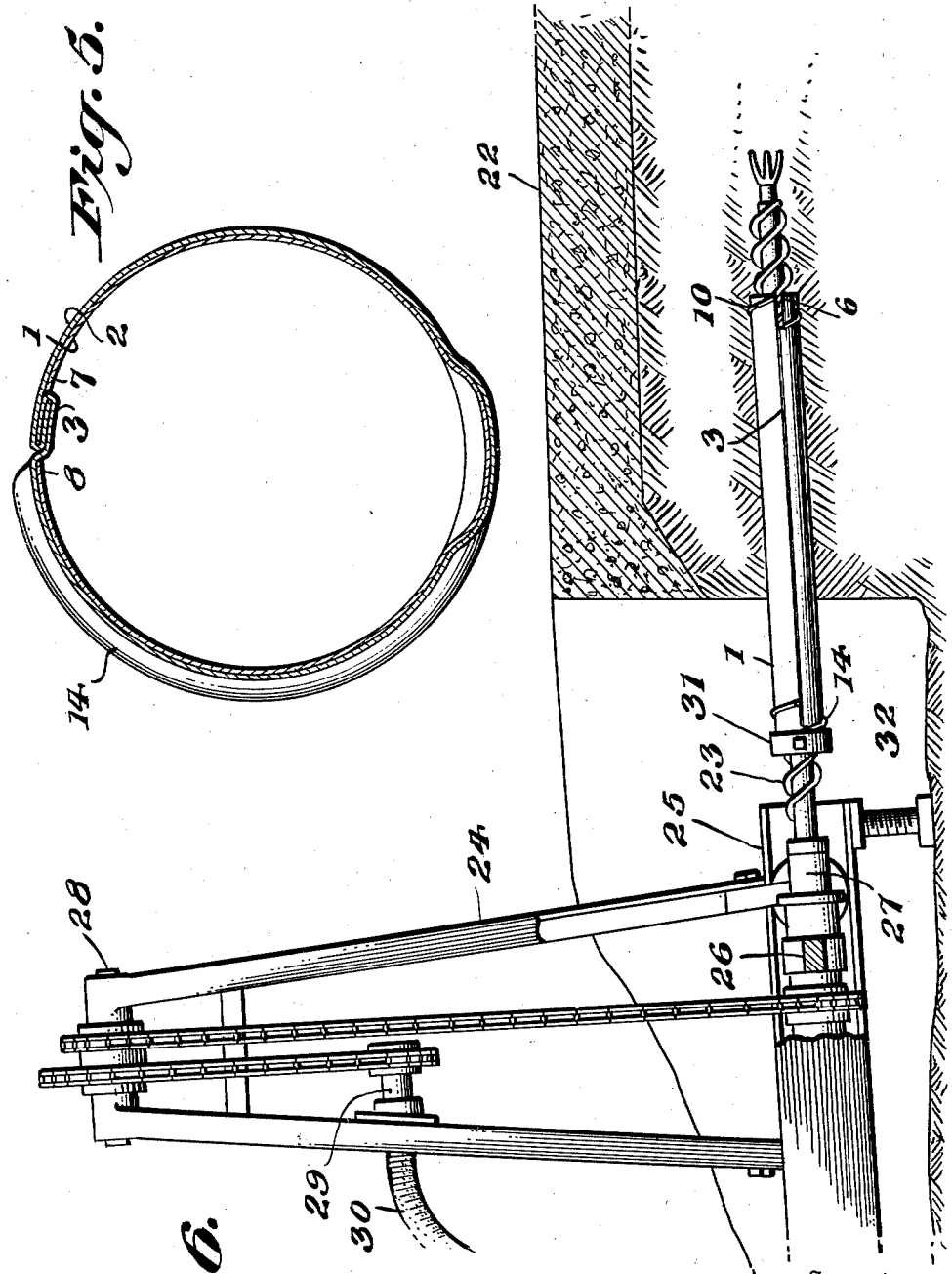
Inventor
Alan Jay Parrish
By Earle D Drummond
Attorney Patented Nov. 7, 1939

2,179,193

UNITED STATES PATENT OFFICE 2,179,193

SHEET METAL PIPE AND PIPE JOINT

Alan Jay Parrish, Paris, Ill., assignor of one-half to Margaret Parrish and one-half to Jane Parrish, both of Paris, Ill.

Application April 10, 1937, Serial No. 136,191

6 Claims. (Cl. 285—146)

This invention relates to metal pipes and pipe joints, and more particularly to sheet metal drain pipes or the like of the locked seam type provided with a pipe joint structure by which pipe sections may be readily joined and locked in connected position. While the invention involves a pipe and joint of general application, it is particularly pointed to and adapted for drainage and culvert use by the method of installation described in my copending application Serial No. 71,015, filed Mar. 26, 1936, now Patent 2,136,151 of November 8, 1938, and in conjunction with the earth boring machine of my copending application Serial No. 120,980, filed January 6, 1937, now Patent 2,136,152 of November 8, 1938.

It is one of the objects of the invention to provide an improved pipe structure particularly designed for insertion beneath the ground, in prebored holes and during boring operations, by a rotative driving force applied at one end of the pipe by a suitable tool or machine.

It is a further object of the invention to provide a sheet metal pipe section of the locked seam type, plain or perforated, having threaded male and female end joint portions with locking means for cooperation with other pipe sections.

Another object of the invention is the provision of a simple lock pipe joint of general application, which, when two or more pipe sections are connected, will hold the associated sections firmly connected so as to make it impossible to rotate in either direction, one section with relation to the other, without destroying the pipe or using mechanical tools.

Among other objects of the invention which will be apparent from the detailed description which follows, is the provision of pipes having helical threaded portions facilitating their connection and providing screw formation for ground engagement for facilitating installation in the ground in providing drains, culverts and the like under existing structures.

In the provision of proper drainage and aeration beneath existing structures including road beds and pavements in particular, trenching and tunneling have been generally employed in placing drain pipes and culverts. These operations are expensive and disturb the normally impacted condition of surrounding soil in which the pipes are placed. In avoidance of the prior practices, the invention of my copending application Serial No. 71,015, provides a thin metal pipe structure with a raised helical thread throughout its length with means for supporting it and rotating it frictionally tight in the ground surrounding prebored holes, or by advancing the pipe during the boring operation. The raised helical thread forming a lead for the pipe, also afforded throughout the entire length of the pipe a driving engagement for a supporting carrier and means for tight frictional engagement with surrounding material.

The present invention provides an improved locked seam pipe structure which can be installed as a drain or culvert by supporting the pipe on the auger of an earth boring machine and applying a rotative driving force at one end of the pipe. Furthermore, the invention provides a pipe section having discontinuous threads at its end portions in conjunction with locking features whereby sections of pipe may be joined against relative rotation in either direction in a manner to transmit a rotative driving force applied at one end of the pipe without damaging or disturbing the joints. Further advantages and uses will be apparent from the following detailed description and the accompanying drawings forming part of this specification, wherein—

Fig. 5 is a cross sectional view taken on line 5—5 of Fig. 2.

Fig. 6 is a view partly in cross section illustrating the manner of supporting the pipe on the auger of an earth boring machine in the course of providing drains under existing structures.

Figure 1:
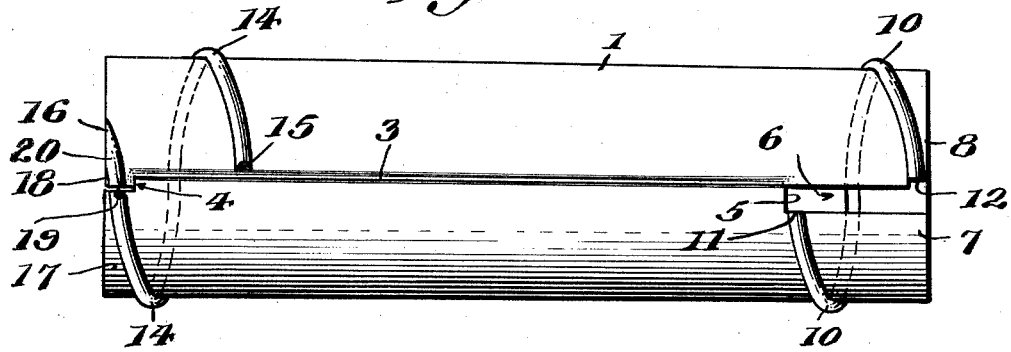
Fig. 1 is a view of a section of pipe in accordance with the invention.

Having reference to the drawings, 1 and 2 represent plain or perforated sheet metal structures of the lock joint type wherein the cooperating edge portions of the sheet metal are locked together defining a seam 3. The structure is such that the raised or thickened portion of the entire seam formed by the locked edge portions is on the inside of the pipe. Each pipe section is provided with male and female end portions of such size respectively as to allow telescopic engagement of the ends of adjacent sections in joining pipe.

The seamed portion 3 of each pipe section does not extend the entire length of the pipe but terminates at points 4 and 5 in the female and male portions unequally distant from the respective ends of the pipe. At the male or smaller end, the pipe is cut away beyond the seam end to the end of the pipe to define a rectangular slot or recess 6 bounded by the side extensions 7 and 8. The width of the slot or recess is determined by the width of the pipe seam, the slot being designed to accommodate therein the seam on the inside of the female or larger end of another section of pipe when the sections are joined. A raised helical pipe connecting thread 10 is rolled or otherwise formed in the wall of the pipe beginning at point 11 beyond the seam end and extending around the pipe toward its end to point 12 in the edge of side extension portion 8. At the larger or female end of the pipe, a similar slightly larger helical thread 14 starts at the point 15, rearwardly of the end of the seam and at one side thereof, and extends around the pipe to point 16 at the end through side extensions 17 and 18 on opposite sides of a longitudinal cut 19 in the pipe beyond the end of the seam and extending inwardly to the seam from the end of the pipe. The continuity of the thread through the end cut portion lies beyond the end of the seam, and that which extended through the side extension 18 to the end of the pipe forms a threaded area 20 which facilitates jointure of male and female pipe sections and provides locking means adapted to be deformed after the pipe connection is made to form a stop behind the terminal point 11 of a corresponding male thread to prevent reverse rotation of the male member from its connected position.

Figure 2:
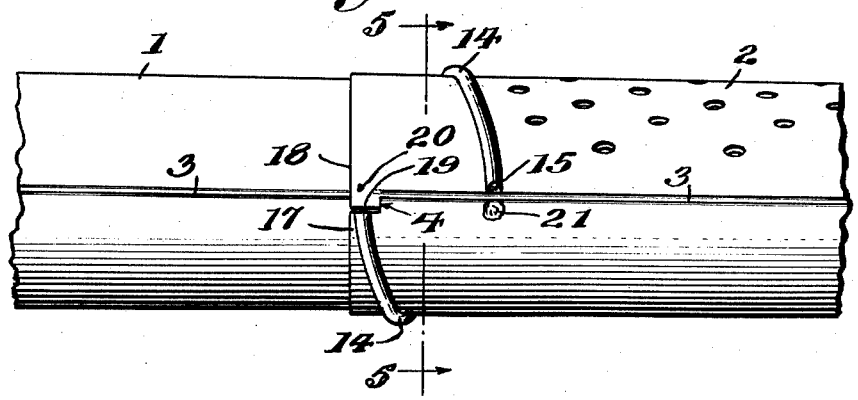
Fig. 2 is a view showing the connection and locked relationship of two pipe sections illustrated in Fig. 1.
Figure 3:
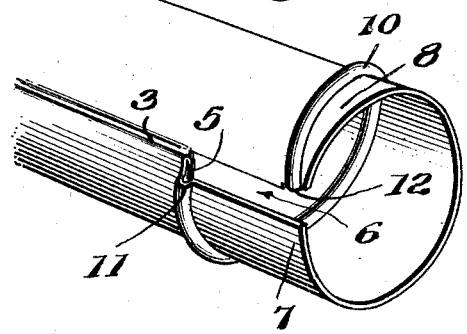
Figs. 3 and 4 are views of the male and female ends of the pipes of Fig. 2.
Figure 4:
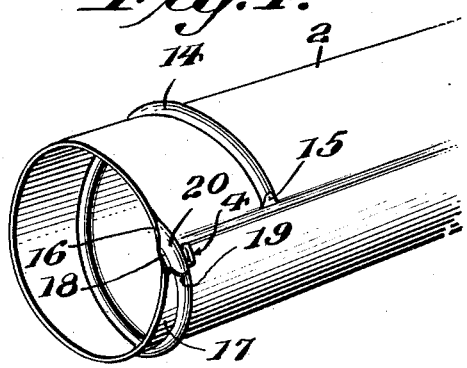

In connecting pipe sections together, the thread in a male member at point 12 is started in the end of the female thread in area 20 and by relative rotation of the sections is made to progress inwardly of the female member until the entering end of the thread reaches the end of the female thread at point 15. In this position, the side extensions 7 and 8 drop into a position of positive engagement respectively on opposite sides of the inside seam with the raised inner seam structure extending within the slot 8. In this position the inner end of the male thread reaches its limit of inward movement and the pipe sections become locked against rotation in either direction by engagement of the side extensions 7 and 8 with the sides of the seam. To further lock the joint against rotation in either direction, unless suitable tools are employed, or without destroying the pipe, the thread portion in the area 20 is deformed by a hammer or other suitable tool to flatten the thread so that the edge of the side extension 18 will lie behind the outer end portion of the male thread as shown in Fig. 2. If desirable, in addition to the forward stop formed by the thread butting against the seam and the side extension edges on either side of the square shoulder caused by the inverted seam on the inside of the female end of the pipe, the pipe can be punched or tapped as at 21 to further insure a complete lock in either direction.

The provision of the raised helical thread as above described at the pipe ends or joint portions alone has been found to afford sufficient lead and rotative frictional engagement for the pipe when it is driven from its end portion by a suitable connecting member in the operation of installing drains and the like beneath pavements and other existing structures. However, if additional strength is required, the raised helical thread may be provided in portions of the pipe other than at the ends but this is only necessary where additional strength is required.

The pipe joint described forms a rigid locked connection between joined sections of relatively thin pipe and may be utilized wherever thin or sheet metal pipes are employed. In the preferred use with drain pipes and culverts, the joint will transmit, through a single section or throughout a plurality of joined sections, the rotative driving force which is necessary to be applied to one end of the pipe by a cooperating threaded head or collar in the process of installing the pipe in prebored holes in the ground or in advancing the pipe during the drilling operation. The lock joint is applicable to pipes other than those of the character described and provides a sure lock against relative rotation in either direction.

Figure 6 illustrates a manner of use in the process of installing lateral drains, culverts and the like under an existing structure, here illustrated as a pavement 22. The pipe 1 is shown supported on the auger 23 of the earth boring and pipe laying machine 24 which is of the type shown and described in my copending application Serial No. 120,980, filed January 6, 1937. Briefly, this machine comprises an adjustable channel base 25 supporting for rolling movement therein the wheeled carriage 26 of the earth boring and pipe laying unit. The auger, which may be sectionalized for extended boring and pipe laying operations, is rotated by the driven shaft of the unit through chuck 27. The unit is operated by power shaft 30 and chain and sprocket gearing interconnecting shafts 28 and 29 and the driven shaft of the unit.

For installation purposes, the pipe is provided at its rear with a driving collar 31 having a set screw 32 for detachable engagement with rotating parts of the boring unit. With the pipe surrounding the auger which serves as a supporting mandrel during installations in predrilled holes or as drilling progresses, the auger normally rotates with respect to the surrounding pipe and driving collar. The auger may be operated in advance of the leading end of the pipe passing borings rearwardly of the pipe until it is desired to progress the pipe by rotation. To advance the pipe, the driving collar is brought into connection with the boring unit by tightening the set screw, after which the collar and pipe may be rotated by the machine to advance the pipe. The collar may then be released from engagement with the machine and the auger may be rotated for continued boring, for clearing the pipe or for withdrawal. The addition of pipe sections and auger sections as drilling proceeds will be understood. Where the installation is short and after the hole has been prebored to the required length, the drillhead and auger may be removed and there can be substituted a plain head carrying a free running self-centering male thread. The lead or male end of the pipe is suitably protected by a cap or block accommodating the male thread and the pipe is advanced by a rotative driving force applied by the drilling machine through the driving collar and set screw described above. In thus installing pipes, the entire thrust of the advancing boring machine is taken at three points, namely, the auger head, the thread at each joint and the collar at the rear of the pipe.

From the foregoing detailed description of the invention, it will be apparent that there is provided a sheet metal pipe section which requires no separate coupling means to join the pipe with locked relationship with other sections. The high pitch helical threads cooperate to form a rigid joint and provide exterior threads for ground engagement in advancing the pipe. As successive sections of pipe are joined the sections become automatically locked against relative rotation and the automatic locking feature is supplemented by other positive locking means providing further insurance against separation. The pipe joint is particularly adapted to withstand the driving force to screw the pipes into the ground without damage to the pipe. However, the pipe and pipe joint is not to be considered as limited to such use.

While the invention has been described in connection with a preferred embodiment, it is to be understood that the words which have been used are words of description rather than of limitation and that changes within the purview of the appended claims may be made without departing from the true spirit of the invention in all its aspects.

I claim:

1. A sheet metal pipe section having male and female ends and a locked seam forming a raised portion extending along the inside of the pipe but terminating short of the pipe ends, said male end portion of the pipe having a slot beyond the seam end defining side extensions beyond the end of the seam and on opposite sides thereof, and a male thread extending around the pipe and terminating at the sides of the slot in the side extensions, said female end portion having a cut extending outwardly from the seam end and a female thread beginning at one side of the seam and extending around the pipe to its end transversely of the cut portion.

2. A locked pipe joint comprising outer and inner threaded tubular members arranged to be telescopically engaged by relative rotation of the members, one of said members having a slot extending lengthwise thereof from one end defining spaced side extensions, a raised portion on the other member between its thread ends adapted to engage in said slot between said side edge portions when the members are rotated into connected position to lock the members against relative rotation in either direction, and means at the end of the thread on the outer member adapted to be deformed to form a stop to prevent reverse rotation of the members from their connected position.

3. A pipe joint for locked seam sheet metal pipes comprising outer and inner threaded tubular members arranged to be telescopically engaged by relative rotation of the members, the inner member having a slot extending lengthwise thereof from one end defining spaced side extensions, the outer member having its locked seam extending inwardly of the member between its thread ends, said side edge portions on the inner member being arranged to engage side edge portions of the inwardly directed seam on the outer member when the members are in their connected position to lock the members against relative rotation, and an abutment at each end of the thread on the outer member adapted to engage the thread ends of the inner member to further prevent relative rotation of the members.

4. A sheet metal pipe having each end thereof provided with a raised helical bead defining a thread on the outside of the pipe and a corresponding groove on the inside of the pipe, one end of the pipe having a longitudinally extending recess intermediate the ends of the helical bead, the pipe being provided at the other end with a longitudinal cut extending from the end of the pipe transversely through the helical bead.

5. A sheet metal pipe having a longitudinally extending locked seam on the inside of the pipe of less length than the pipe, one end portion of the pipe having a recess extending outwardly from its seam end and a helical thread extending around the pipe from opposite sides of the recess, the other end portion of the pipe having a helical thread extending around the pipe and a longitudinal cut extending from the end of the pipe transversely through the helical thread.

6. A sheet metal pipe having a longitudinally extending locked seam on the inside of the pipe of less length than the pipe, an end portion of the pipe having therein a longitudinally extending slot of sufficient width to receive therein the lock seam of another pipe, a single helical thread extending around the pipe from side edges defining the slot, and a helical thread at the other end of the pipe extending around the pipe and terminating at points on opposite sides of the seam.

ALAN JAY PARRISH.